United States Patent [19]

Davey

[11] 4,010,101
[45] Mar. 1, 1977

[54] LIQUID TRAP

[76] Inventor: Cyril Davey, 4 Tamara Flats, Tamara St., Tamara Park, Verwoerdburg, Transvaal, South Africa

[22] Filed: July 19, 1976

[21] Appl. No.: 706,492

[52] U.S. Cl. ................................. 210/86; 210/313
[51] Int. Cl.² ......................................... B01D 29/00
[58] Field of Search ............. 210/86, 91, 114, 115, 210/116, 313

[56] References Cited

UNITED STATES PATENTS

| | | | |
|---|---|---|---|
| 3,386,581 | 6/1968 | Gough | 210/86 |
| 3,568,835 | 3/1971 | Hansen | 210/86 |
| 3,868,321 | 2/1975 | Gough | 210/86 |

*Primary Examiner*—John Adee
*Attorney, Agent, or Firm*—Harness, Dickey & Pierce

[57] ABSTRACT

A trapping device for trapping foreign liquids having a specific gravity greater than that of a supply liquid comprises a settling chamber defined primarily by a tubular side wall and two end pieces and inlet and outlet chambers in the settling chamber and adjacent to an upper one of the end pieces. An inlet and an outlet lead to and from the inlet and outlet chambers, which are separated by an imperforate wall. The imperforate wall has a pair of wing means diverging radially outwardly. Foraminous wall means are arranged so that fluid passing through the chambers from the inlet to the outlet passes through the foraminous wall means. A pair of spaced contacts extend into the settling chamber and a float in the settling chamber having a specific gravity higher than that of the supply liquid and lower than that of the foreign liquids has a bridge member for bridging the contacts to establish an electrical path between said contacts when the float is raised to a predetermined level by floating on the foreign liquids.

9 Claims, 3 Drawing Figures

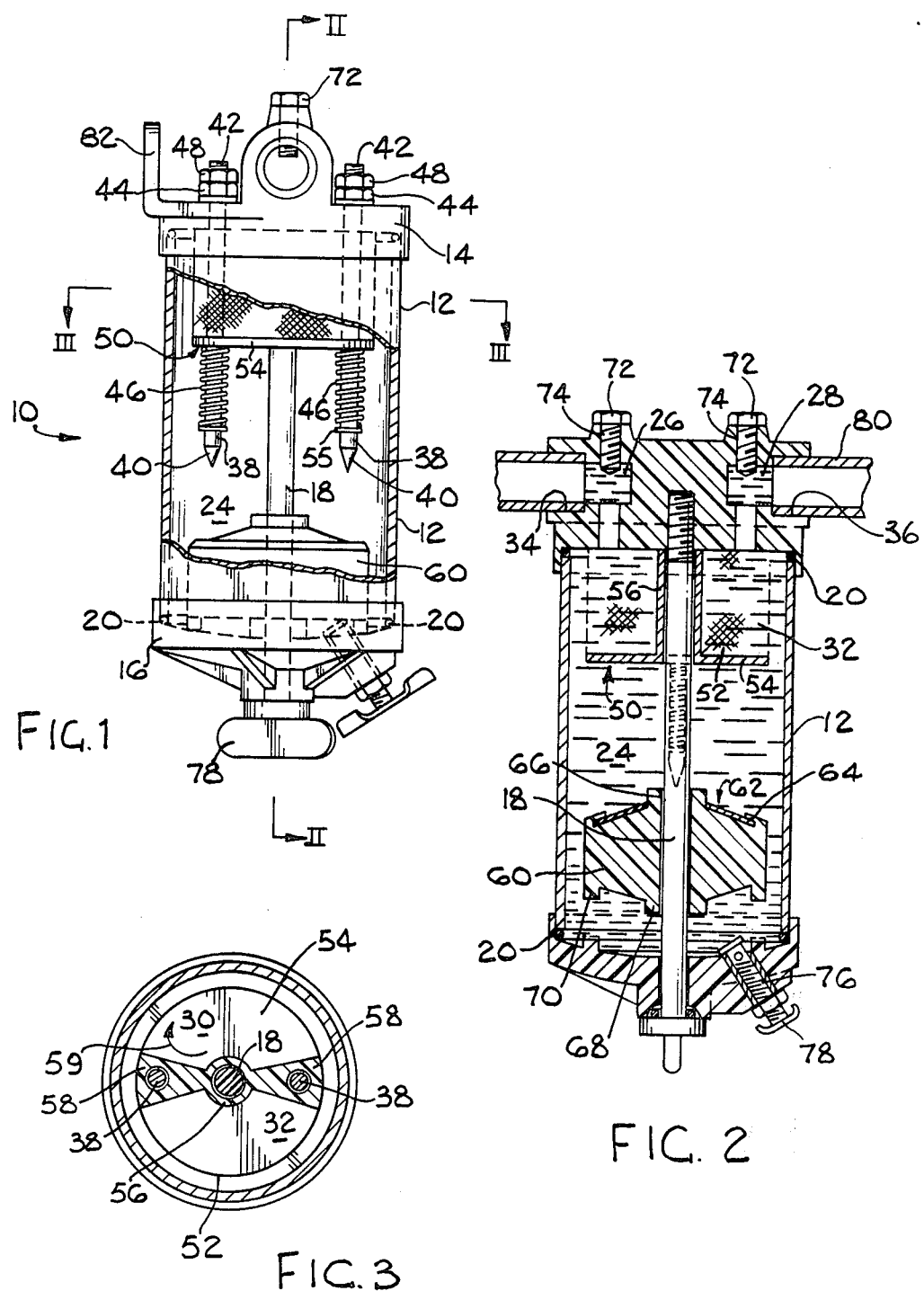

LIQUID TRAP

FIELD OF THE INVENTION

This invention relates to a trapping device for connection to a liquid supply line for trapping foreign liquids contained in the supply liquid and having a specific gravity greater than that of the supply liquid and is particularly suitable for connection to a liquid supply line such as a fuel supply line for an internal combustion engine.

BACKGROUND OF THE INVENTION

Such a device is described in Applicant's U.K. Pat. No. 1,062,701. This device has walls defining a settling chamber having an inlet opening and an outlet opening in its upper region. Means are provided for connecting the chamber in series with the liquid supply line. A float is located in the chamber and has a specific gravity higher than that of the supply liquid and lower than that of the foreign liquids. Electrical switch means having means for connection to an electrical warning signal are operable by the float so that when the float is in an upper position the circuit is closed and when the float is in a lower position the circuit is open. A warning signal is thus produced when the upper surface of the foreign liquids trapped in the settling chamber reaches a predetermined level.

The switch means includes two spaced conductors within the chamber and electrically insulated from each other and a bridge member, which comprises an annulus of electrically conductive material on the float for bridging the space between the conductors to establish an electrical path between them when the float is in its upper position.

A foraminous element is provided in the settling chamber and arranged in such a way that liquid flowing from the inlet opening to the outlet opening will pass at least once through the foraminous element. The foraminous element is part of a cage within the settling chamber and provides a foraminous wall between the inlet and outlet openings of the chamber.

A drain outlet valve is provided for the lower region of the settling chamber to permit foreign liquids which are separated out and trapped in the settling chamber to be drained from the chamber.

BRIEF DESCRIPTION OF THE INVENTION

The device of the present invention is an improved form of that shown in Applicant's U.K. patent.

The improved device comprises a tubular side wall having upper and lower ends, upper and lower end pieces defining sockets releasably receiving the upper and lower ends of the side wall, and sealing means forming seals between the end pieces and the side wall, a settling chamber being defined primarily by the side wall and the end pieces. Inlet and outlet chambers are provided in said settling chamber and adjacent to said upper end piece, an inlet leading through the upper end piece into said inlet chamber and an outlet leading through the upper end piece from said outlet chamber. A substantially imperforate wall separates said inlet and outlet chambers. The imperforate wall of the present application is an improved wall comprising a tubular hub and a pair of wing means at opposite sides of the hub. These wing means each diverge outwardly away from the hub and serve to increase circulation of supply fluid flowing through the device.

A pair of spaced contact means extend through the upper end piece and through the wing means into the settling chamber. The contact means are connectable to an electrical warning signal circuit.

Flow paths connect said settling chamber with said inlet and outlet chambers and foraminous wall means are arranged across the flow paths whereby fluid passing through the chambers from the inlet to the outlet passes through at least one said foraminous wall means.

The foraminous wall means and said imperforate wall may form part of a cage at least partly defining the inlet and outlet chambers. The foraminous wall means may each form part of a substantially cylindrical wall of said cage and the tubular side wall may also be substantially cylindrical so that an annular cavity is defined between the cage and the tubular wall. The wing means can cause circulation of supply fluid through this cavity and through the foraminous wall means. This increases the efficiency of the wall means.

The cage may have an end wall spaced from the upper end piece and a stop element such as a spring clip may be provided on each contact means. A spring encircling each contact means may then press against the stop element to bias the end wall of the cage towards the upper end piece. The spring clip can be easily removed or replaced to simplify assembly and dismantling of the device.

A float in the settling chamber having a specific gravity higher than that of the supply liquid and lower than that of the foreign liquids carries a bridge member for bridging the space between the contact means to establish an electrical path between said contact means when the float is raised sufficiently by floating on the foreign liquids.

A shank can pass through the tubular hub and the settling chamber to connect the end pieces. The shank may have a threaded end screwed into one of the end pieces and a head adapted to be gripped manually for screwing the threaded end of the shank into and out of said one of the end pieces. This also simplifies assembly and dismantling of the device.

A manually operable drain outlet valve can be provided in the lower end piece for draining the settling chamber. Because many of the parts of the device can be operated or removed without tools, the device and its assembly are simplified for manufacturing purposes. Furthermore, the device can be more readily drained or stripped for cleaning.

In addition, the use of the diverging wing elements increases the efficiency of the device in separating foreign liquids from the supply liquid.

BRIEF DESCRIPTION OF THE DRAWINGS

The invention will now be described with reference to the accompanying drawings in which a particular embodiment of the invention is shown by way of example.

In the drawings:

FIG. 1 is a side view, partly in section, of a trapping device according to the invention;

FIG. 2 is a section taken on line II—II of FIG. 1 but showing the device filled with liquid; and FIG. 3 is a section on line III—III of FIG. 1.

DETAILED DESCRIPTION OF THE DRAWINGS

Reference numeral 10 indicates generally a trapping device for connection to a liquid supply line, such as a fuel line, for trapping foreign liquids, such as water, contained in the supply liquid and having a specific gravity greater than that of the supply liquid. The device comprises a tubular side wall 12 and transversely disposed upper and lower end walls 14 and 16 which have peripheral flanges defining sockets for receiving upper and lower ends of the wall 12. The end walls are held in an assembled condition by means of a threaded shank 18 which engages a screw-threaded hole in the end wall 16. The shank has a head adapted to be gripped manually to enable the end walls to be readily separated from the wall 12.

Between the side wall 12 and each end wall 14 and 16 there is provided an O-ring 20, of resilient material such as rubber to ensure that a sealed settling chamber 24 is defined between the side wall and the end walls.

The end wall 14 is provided with inlet passage 26 and an outlet passage 28 which communicate respectively with an inlet chamber 30 and an outlet chamber 32. The passages 26 and 28 are provided with screw-threaded regions 34 and 36 by means of which the device can be connected in series in a liquid supply line.

The end wall 14 is moulded of electrically insulating synthetic plastics material. In this end wall there are mounted a pair of spaced electrical conductors 38, the conductors being electrically insulated from one another. Each conductor 38 has a sharpened contact establishing region 40 and a screw-threaded region 42 to receive nuts 44. The length of penetration of each conductor 38 into the settling chamber 24 is adjustable by means of the threaded region 42 and the nuts 44. A further nut 48 is provided to permit an electrical lead to be clamped onto the conductor between the nuts 44 and 48.

In the settling chamber 24 there is provided a cage 50 having a side wall 52 of foraminous material such as a fine gauge gauze for example of metal such as copper. The cage 50 further comprises a transversely disposed end wall 54 of synthetic plastics material to which is secured a tubular hub 56 having a bore through which the shank 18 extends. A pair of wings 58 are integral with the end wall 54 and with the tubular hub 56 and divide the cage 50, to provide the chambers 30 and 32. Holes are provided through the wings and the end wall 54 to permit the conductors 38 to extend therethrough.

The cage 50 is maintained in position by springs 46 which encircle conductors 38 and act between the end wall 54 and stops 55 on the conductors. The stops are in the form of spring clips which fit in annular grooves in the conductors. The arrangement is such that the chambers defined in the cage 50 are respectively in register with the inlet passage 26 and the outlet passage, whereby the liquid flowing through the device from the inlet to the outlet opening passes twice through the foraminous side wall 52.

The wings 58 diverge away from the hub 56 and tend to cause liquid flowing into the chamber 30 to circulate within the inlet chamber for example in the direction of arrow 59, and to impinge on the wall 52 at only a slight angle to the wall over most of its length. This improves separation of the foreign liquids away from the supply liquids. The liquid leaving the inlet chamber tends to flow in a circular path about the cage 50. It then enters the outlet chamber 32 by impinging against the wall 52 at a slight angle to the wall over most of the wall length and then passing through the wall 52.

A float 60 has a body of electrically insulating material, such as a synthetic plastics material, with a frusto-conical upper surface 62 having a recessed cavity in which there is secured a ring 64 of electrically conductive material such as copper. The float has a specific gravity higher than that of the supply liquid and lower than that of the foreign liquids to be separated from the supply liquids. The ring 64 is capable of bridging the space between the spaced conductors 38 and of establishing an electrical path between them.

The float 60 has a straight-through central bore 66 to permit the float to slide along the shank 18 and to be guided by the shank. A clearance space is defined between the peripheral surface of the bore 66 and the shank 18 to permit limited tilting movement of the float 60 with respect to the shank 18. This limited tilting movement is advantageous in ensuring good contact with the contact establishing regions 40 of the conductors 38 when the shank 18 is inclined with respect to the vertical. At the lower region of the float 60 there are provided a projecting formation 68 and a rim 70 to permit a clearance space to be defined between the bottom of the float 60 and the end wall 16 when the formation 68 and rim 70 are in abutment against the end wall. The clearance space is advantageous in permitting liquid to act upon the bottom of the float and to allow the float 60 to be displaced away from the end wall 16 by the foreign liquids.

In the end wall 16 there are provided screw-threaded plugs 72 capable of closing bleed openings 74 in communication with the passages 26 and 28. The plugs 72 are manually operable and, when removed, fluids are permitted to flow through the bleed opening 74 into or out of the settling chamber 24, thereby facilitating the filling or draining of the settling chamber 24.

In the end wall 16 there is provided a drain valve 76 having an end 78 which can be manually gripped, the valve thus being manually operable, and which is adapted to permit foreign liquids which are trapped in the settling chamber 24 to be drained therefrom.

In use, the device is connected in series in a liquid supply line 80, such as a fuel line, by means of the screw-threaded regions 34 and 36. The contacts are connected to a warning device. The supply liquid, in which foreign liquids such as water are contained, flows through the inlet passage 26 and the inlet chamber 30 through the foraminous side wall 52 into the settling chamber 24. In flowing through the foraminous side wall 52 the droplets of foreign liquid which are contained in the supply liquid are partially separated from the supply liquid by the foraminous wall 52 and further by virtue of the differences between the specific gravities of the foreign and the supply liquids. The foreign liquid settles to the bottom of the settling chamber 24. The purified supply liquid flows from the settling chamber 24 through the foraminous side wall 52 into the interior of the cage 50, through the outlet chamber 32 and through the outlet passage 28 back into the liquid supply line.

As the volume of settled and trapped foreign liquid which is separated from the supply liquid increases, the line of demarcation between the settled foreign liquid and the supply liquid rises. As the line of demarcation between the supply liquid and the foreign liquid rises, the float rises until a predetermined level is reached at which level the ring 64 establishes electrical contact between the contact establishing regions 40 of the conductors 38. The warning device connected to the contacts can detect this and a signal can be emitted by the device. The drain valve 76 is then operated to permit the foreign liquid which is trapped in the settling chamber 24 to be drained therefrom.

A bracket 82 is provided for attaching the device 10 to a supporting structure or surface.

I claim:

1. A trapping device for a liquid supply line for trapping foreign liquids contained in a supply liquid, said foreign liquids having a specific gravity greater than that of the supply liquid, the device comprising
 a tubular side wall having upper and lower ends,
 a lower end piece defining a socket releasably receiving the lower end of the side wall,
 an upper end piece defining a socket releasably receiving the upper end of the side wall,
 sealing means forming seals between the end pieces and the side wall,
 a settling chamber defined primarily by the side wall and the end pieces,
 inlet and outlet chambers in said settling chamber and adjacent to said upper end piece,
 an inlet leading through the upper end piece into said inlet chamber,
 an outlet leading through the upper end piece from said outlet chamber,
 a substantially imperforate wall separating said inlet and outlet chambers, said imperforate wall comprising a tubular hub and a pair of wing means at opposite sides of the hub and each diverging outwardly away from the hub,
 flow paths connecting said settling chamber with said inlet and outlet chambers,
 foraminous wall means partly defining said inlet and outlet chambers, said foraminous wall means being arranged across said flow paths whereby fluid passing through the chambers from the inlet to the outlet passes through at least one said foraminous wall means,
 a pair of spaced contact means extending through the upper end piece and through said wing means into the settling chamber, said contact means having connector portions outside said settling chamber and connectable to an electrical warning signal circuit,
 a float in the settling chamber having a specific gravity higher than that of the supply liquid and lower than that of the foreign liquids, and
 a bridge member on the float for bridging the space between the contact means to establish an electrical path between said contact means when the float is raised to a predetermined level by floating on the foreign liquids.

2. A trapping device according to claim 1, wherein a shank passing through the tubular hub and the settling chamber connects the end pieces, the shank having a threaded end screwed into one of the end pieces and a head adapted to be gripped manually for screwing the threaded end of the shank into and out of said one of the end pieces.

3. A trapping device according to claim 2, wherein said foraminous wall means and said imperforate wall form part of a cage at least partly defining the inlet and outlet chambers, the cage having an end wall spaced from the upper end piece, wherein a stop element is provided on each contact means, and wherein a spring encircles each contact means and presses against the stop element thereon, the spring biassing the end wall of the cage towards the upper end piece.

4. A trapping device according to claim 3, wherein the foraminous wall means each form part of a substantially cylindrical wall of said cage, wherein the tubular side wall is substantially cylindrical, and wherein an annular cavity is defined between the cage and the tubular side wall.

5. A trapping device according to claim 4, wherein a groove is formed in each contact means and wherein each stop element is a spring clip seated in a respective groove.

6. A trapping device according to claim 5, wherein a drain outlet valve is provided in the lower end piece for draining the settling chamber, the drain outlet valve being a manually operable valve.

7. A trapping device for containing a supply liquid and foreign liquids from a supply liquid, said foreign liquids having a specific gravity greater than that of the supply liquid, the device comprising
 a tubular side wall having upper and lower ends,
 a lower end piece containing a sealing ring and defining a socket for sealingly and releasably receiving the lower end of the side wall,
 an upper end piece containing a sealing ring and defining a socket for sealingly and releasably receiving the upper end of the side wall,
 a settling chamber defined by the side wall and the end pieces,
 a float in the settling chamber having a specific gravity higher than that of the supply liquid for floating only on the foreign liquids,
 inlet and outlet chambers in said settling chamber and adjacent to said upper end piece,
 an inlet leading into said inlet chamber,
 an outlet leading from said outlet chamber,
 a shank passing through the tubular hub, the settling chamber and the float and connecting the end pieces, the shank having a threaded end screwed into one of the end pieces and a head adapted to be gripped manually for screwing the threaded end of the shank into and out of said one of the end pieces,
 an imperforate wall having a bore receiving said shank, said wall comprising a pair of wall elements each diverging outwardly away from the shank and separating said inlet and outlet chambers,
 foraminous wall means partly defining said inlet and outlet chambers whereby fluid passing through the chambers from the inlet to the outlet passes through at least one foraminous wall means,
 spaced contacts extending through the upper end piece into the settling chamber, said contacts having electrical terminals outside the settling chamber, and
 means for bridging the contact means and establishing an electrical path therebetween.

8. A trapping device according to claim 7, including a generally cylindrical cage formed partly by said foraminous wall means and containing the inlet and outlet chambers, the tubular side wall being of substantially circular cross section and an annular cavity being defined between the cage and the tubular side wall.

9. A trapping device according to claim 8, wherein a seating groove is formed in each contact, wherein a spring clip is seated in each said groove, and wherein a spring encircles each contact and presses against the cage to bias the cage against the upper end piece.

* * * * *